(12) United States Patent
Wiesman et al.

(10) Patent No.: US 11,372,954 B2
(45) Date of Patent: Jun. 28, 2022

(54) SYSTEMS AND METHODS FOR AUTHENTICATING AN IDENTITY OF A USER OF A TRANSACTION CARD

(75) Inventors: Mark Wiesman, Chesterfield, MO (US); Maurice David Liscia, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1138 days.

(21) Appl. No.: 12/343,837

(22) Filed: Dec. 24, 2008

(65) Prior Publication Data

US 2010/0161470 A1 Jun. 24, 2010

(51) Int. Cl.
*G06F 21/31* (2013.01)
*G06Q 20/40* (2012.01)
*G06Q 40/00* (2012.01)

(52) U.S. Cl.
CPC ............ *G06F 21/31* (2013.01); *G06Q 20/40* (2013.01); *G06Q 20/4014* (2013.01); *G06Q 20/40975* (2013.01); *G06Q 40/00* (2013.01); *G06F 2221/2115* (2013.01)

(58) Field of Classification Search
CPC ........ G06Q 40/00; G06Q 40/02; G06Q 20/40; G06Q 20/10; G06Q 20/04
USPC .......................................................... 705/44
See application file for complete search history.

(56) References Cited

U.S. PATENT DOCUMENTS

| | | | |
|---|---|---|---|
| 6,915,279 B2 | 7/2005 | Hogan et al. | |
| 6,990,470 B2 | 1/2006 | Hogan et al. | |
| 7,058,611 B2 | 6/2006 | Kranzley et al. | |
| 7,379,919 B2 | 5/2008 | Hogan et al. | |
| 2002/0091646 A1 | 7/2002 | Lake et al. | |
| 2002/0169664 A1* | 11/2002 | Walker .................. | B42D 15/00 705/14.36 |
| 2003/0061097 A1* | 3/2003 | Walker et al. ................ | 705/14 |
| 2003/0200184 A1 | 10/2003 | Dominguez et al. | |

(Continued)

OTHER PUBLICATIONS

Singh ("Developing a measure of risk adjusted revenue (RAR) in credit cards market: Implications for customer relationship management", European Journal of Operational Research 224.2: pp. 425-434. Elsevier. (Jan. 16, 2013)).*

(Continued)

*Primary Examiner* — Gregory A Pollock
(74) *Attorney, Agent, or Firm* — Armstrong Teasdale LLP (57) ABSTRACT

An input device associated with a user and an issuer computer system associated with an issuer are coupled to an interchange computer system associated with a network interchange. The interchange computer system is configured to authenticate an identity of a user of a transaction card as a legitimate cardholder. More specifically, the interchange computer system is configured to receive a registration request from the user using the input device wherein the registration request includes an account number or a name associated with the transaction card, generate an authentication message in response to the registration request, transmit the authentication message to an issuer of the transaction card wherein the issuer provides the authentication message to the user, and receive the authentication message from the user entering the authentication message into the input device to authenticate the identity of the user as the legitimate cardholder.

15 Claims, 5 Drawing Sheets

(56) References Cited

U.S. PATENT DOCUMENTS

| | | | |
|---|---|---|---|
| 2004/0019564 | A1 | 1/2004 | Goldthwaite et al. |
| 2005/0075985 | A1 | 4/2005 | Cartmell |
| 2006/0106738 | A1 | 5/2006 | Schleicher |
| 2007/0145121 | A1 | 6/2007 | Dallal et al. |
| 2007/0219871 | A1* | 9/2007 | Rolf ...................... G06Q 30/02 705/14.4 |
| 2008/0010217 | A1 | 1/2008 | Hobson et al. |
| 2008/0010220 | A1 | 1/2008 | Hobson et al. |
| 2008/0052183 | A1 | 2/2008 | Hobson et al. |
| 2008/0301056 | A1 | 12/2008 | Weller et al. |
| 2009/0248700 | A1* | 10/2009 | Amano et al. .................. 707/10 |
| 2010/0106570 | A1* | 4/2010 | Radu et al. .................. 705/14.3 |
| 2012/0078755 | A1* | 3/2012 | Subbarao ........... G06Q 30/0641 705/27.1 |

OTHER PUBLICATIONS

International Search Report and Written Opinion of the International Searching Authority dated Jan. 26, 2010; Application No. PCT/US2009/68036; 6 pages.

https://www.paypal-apac.com/th/security-centre/your-guide-to-verification/verifying-your-credit-debit-card.aspx; PayPal Home page; "Verifying Your Credit/Debit Card", Copyright 1999-2010 PayPal (3 pages). (Undated Reference, Not Admitted as Proir Art).

* cited by examiner

SYSTEMS AND METHODS FOR AUTHENTICATING AN IDENTITY OF A USER OF A TRANSACTION CARD

BACKGROUND OF THE INVENTION

This invention relates generally to systems and methods for authenticating an identity of a user of a financial transaction card and, more particularly, to network-based systems and methods for authenticating an identity of a user of a financial transaction card when the user is attempting to register with a program offered by a network interchange by generating an authentication message that is accessed by the user from an issuer of the financial transaction card.

Financial transaction cards have made great gains in the United States and elsewhere as a means to attract financial accounts to financial institutions and, in the case of credit cards, as a medium to create small loans and generate interest income for financial institutions. Nonetheless, the financial transaction card industry is subject to certain well-known problems.

Taking the credit card industry, for example, it is well-known that at least some persons will engage in illegal or potentially illegal activities. Specifically, one person may steal a credit card from another person and attempt to use the credit card to purchase products, pay for services, obtain cash or register for certain type of programs being offered in order to take advantage of these programs. Such problems are not limited to credit cards. Other examples include debit cards, gift cards, stored value cards, and check cards.

Of course, in certain transactions, for example, on-line and telephonic transactions, it has become increasingly difficult to ensure that a person who conducts a transaction is the legitimate cardholder. For example, in one embodiment, it is no longer necessary to present a physical financial transaction card to a merchant. Rather, only the numbers (e.g., account numbers and/or expiration date) associated with the financial transaction card are needed to complete a transaction, including registering with a program that may be offered by the network interchange. The fact that a person does not need to present a physical financial transaction card for certain transactions only amplifies the problems mentioned herein.

The other parties involved in facilitating such transactions, namely the acquirer bank, the issuer bank, and the financial transaction card network (also known as the network interchange or the interchange) generally do not require the legitimate cardholder to pay for such fraudulent transactions. Such a requirement will likely result in the loss of goodwill and perhaps the loss of the legitimate cardholder as a customer. However, the fraudulent transactions are a loss to one or more of these entities. As a result, companies have tried to find an effective way to ensure the security of transactions, especially those in which the financial transaction card is not present, and to decrease the risk of theft or misuse of financial information.

Accordingly, a system and method is needed that provides additional security for authenticating an identity of a user of a financial transaction card, particularly in the cases when the financial transaction card is not present for a transaction, including when the user is attempting to register online or telephonically with a program offered by the network interchange.

BRIEF SUMMARY OF THE INVENTION

In one aspect, a method for authenticating an identity of a user of a transaction card as a legitimate cardholder is provided. The user uses an input device communicatively coupled to a computer that is communicatively coupled to a memory for storing information. The method includes receiving at the computer a registration request from the user using the input device wherein the registration request includes at least one of an account number and a name associated with the transaction card, generating an authentication message in response to the registration request, transmitting the authentication message to an issuer of the transaction card wherein the issuer provides the authentication message to the user, and receiving at the computer the authentication message from the user entering the authentication message into the input device to authenticate the identity of the user as the legitimate cardholder.

In another aspect, a computer for authenticating an identity of a user of a transaction card as a legitimate cardholder is provided. The computer is communicatively coupled to a memory and an input device. The computer is configured to receive a registration request from the user using the input device wherein the registration request includes at least one of an account number and a name associated with the transaction card, generate an authentication message in response to the registration request, transmit the authentication message to an issuer of the transaction card wherein the issuer provides the authentication message to the user, and receive the authentication message from the user entering the authentication message into the input device to authenticate the identity of the user as the legitimate cardholder.

In yet another aspect, a system for authenticating an identity of a user of a transaction card as a legitimate cardholder is provided. The system includes an input device associated with the user, an issuer computer system associated with an issuer of the transaction card, and an interchange computer system associated with a network interchange. The interchange computer system is communicatively coupled to a memory, the input device, and the issuer computer system. The interchange computer system is configured to receive a registration request from the user using the input device wherein the registration request includes at least one of an account number and a name associated with the transaction card, generate an authentication message in response to the registration request, transmit the authentication message to an issuer of the transaction card wherein the issuer provides the authentication message to the user, and receive the authentication message from the user entering the authentication message into the input device to authenticate the identity of the user as the legitimate cardholder.

In yet another aspect, a computer program embodied on a computer-readable medium for authenticating an identity of a user of a transaction card as a legitimate holder is provided. The user using an input device communicatively coupled to a computer. The computer configured to store and process the computer program. The computer program comprising at least one code segment that receives a registration request from the user using the input device wherein the registration request includes at least one of an account number and a name associated with the transaction card, generates an authentication message in response to the registration request, transmits the authentication message to an issuer of the transaction card wherein the issuer provides the authentication message to the user, and receives the authentication message from the user entering the authentication message into the input device to authenticate the identity of the user as the legitimate cardholder.

DETAILED DESCRIPTION OF THE INVENTION

The methods and systems described herein relate to a financial transaction card payment system, such as a credit card payment system using the MasterCard® interchange (MasterCard is a registered trademark of MasterCard International Incorporated located in Purchase, N.Y.). The MasterCard® interchange is a proprietary communications standard promulgated by MasterCard International Incorporated® for the exchange of financial transaction data between financial institutions that have registered with MasterCard International Incorporated®.

The embodiments described herein are directed to systems and methods for authenticating an identity of a user of a financial transaction card, such as a credit card, debit card, membership card, promotional card, frequent flyer card, identification card, prepaid card, gift card, and/or any other devices that may hold payment account information, such as mobile phones, personal digital assistants (PDAs), and key fobs. Such cards and/or devices are referred to herein as "a card" or "cards." These cards can all be used as a method of payment for performing a transaction. For example, a transaction card franchiser, transaction card provider, bank, and/or credit union may capture and store transaction data for account holders. The transaction data for each transaction may include an account number, a cardholder data, a merchant identification, a transaction amount, a transaction date, and/or any other suitable information related to the transaction.

In the exemplary embodiment, the systems and methods authenticate an identity of a user of a card, when the user is attempting to register with a program offered by a network interchange, by generating an authentication message that is accessed by the user from an issuer of the card. Specifically, the system described herein includes an interchange computer system associated with the network interchange that processes the transaction data related to the card, and an issuer computer system associated with the issuer of the card. When a user attempts to register with a program being offered by the network interchange, the user typically accesses the interchange computer system either through a remote computer system or by telephone. After inputting an account number or other identifying data, the user must then authenticate his or her identity to the interchange computer system. In the exemplary embodiment, the authentication is performed by the interchange computer system generating an authentication message which is transmitted to the issuer computer system.

While a person who possesses a physical card or its corresponding account numbers may not be the legitimate cardholder, the legitimate cardholder will typically receive a paper billing statement via mail or have access to an electronic version of the billing statement by accessing the issuer computer system. To access the issuer computer system, the legitimate cardholder typically must satisfy at least one of several security features using a remote computer or telephone, including, but not limited to, providing a password or PIN, selecting an authentication image or sound, and an interactive voice response system. By providing an authentication message to the issuer such that it can then be provided to the cardholder via a billing statement, the exemplary embodiments of the systems and methods described herein facilitate increasing the likelihood that a person who registers for a program with the network interchange is the legitimate cardholder associated with the account.

After obtaining the authentication message from the issuer, the user then transmits or provides the authentication message to the interchange computer system so that the interchange computer system can complete the authentication of the identity of the user, confirming that the user is the true cardholder of the card. The user can then complete registering with the program being offered by the network interchange.

If it is determined that a person attempting to register with a program offered by the network interchange does not appear to be the legitimate cardholder of the card, the systems and methods described herein will notify the network interchange (e.g., MasterCard®) or the issuer (or its agent) of the card so that the person and incident can be investigated further.

A technical effect of the systems and methods described herein include at least one of (a) providing a card issued by an issuer to a cardholder, wherein transactions involving the card are processed over a network interchange; (b) providing an issuer computer system that is associated with the issuer; (c) providing an interchange computer system that is associated with the network interchange; (d) receiving a registration request, including cardholder data, from a user for a program being offered through the interchange computer system, wherein the cardholder data includes at least one of an account number, a name, or other information used to identify the cardholder, and wherein the user accesses the interchange computer system via a remote input device, including a computer, a telephone, or other device capable of communicating with the interchange computer system; (e) generating a transaction against the account at the interchange computer system for authenticating the identity of the user, wherein transaction data includes an authentication message; (f) storing the authentication message within a database communicatively coupled to the interchange computer system; (g) transmitting the authentication message from the interchange computer system to the issuer computer system to enable the authentication message to appear on a statement associated with the account, wherein the statement is at least one of a paper billing statement and an electronic billing statement; (h) prompting the user at the interchange computer system to obtain the authentication message from the issuer by at least one of receiving the paper billing statement from the issuer and accessing the issuer computer system after satisfying security features provided by the issuer computer system to obtain the electronic billing statement; (i) receiving an inputted authentication message at the interchange computer system from the user; (j) comparing the inputted authentication message with the stored authentication message; and (k) authenticating the identity of the user when the interchange computer system confirms that the inputted authentication message matches the stored authentication message. After the identity of the user is authenticated, the user can then continue to register for the program being offered by the interchange.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T, New York, N.Y.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

Figure 1:
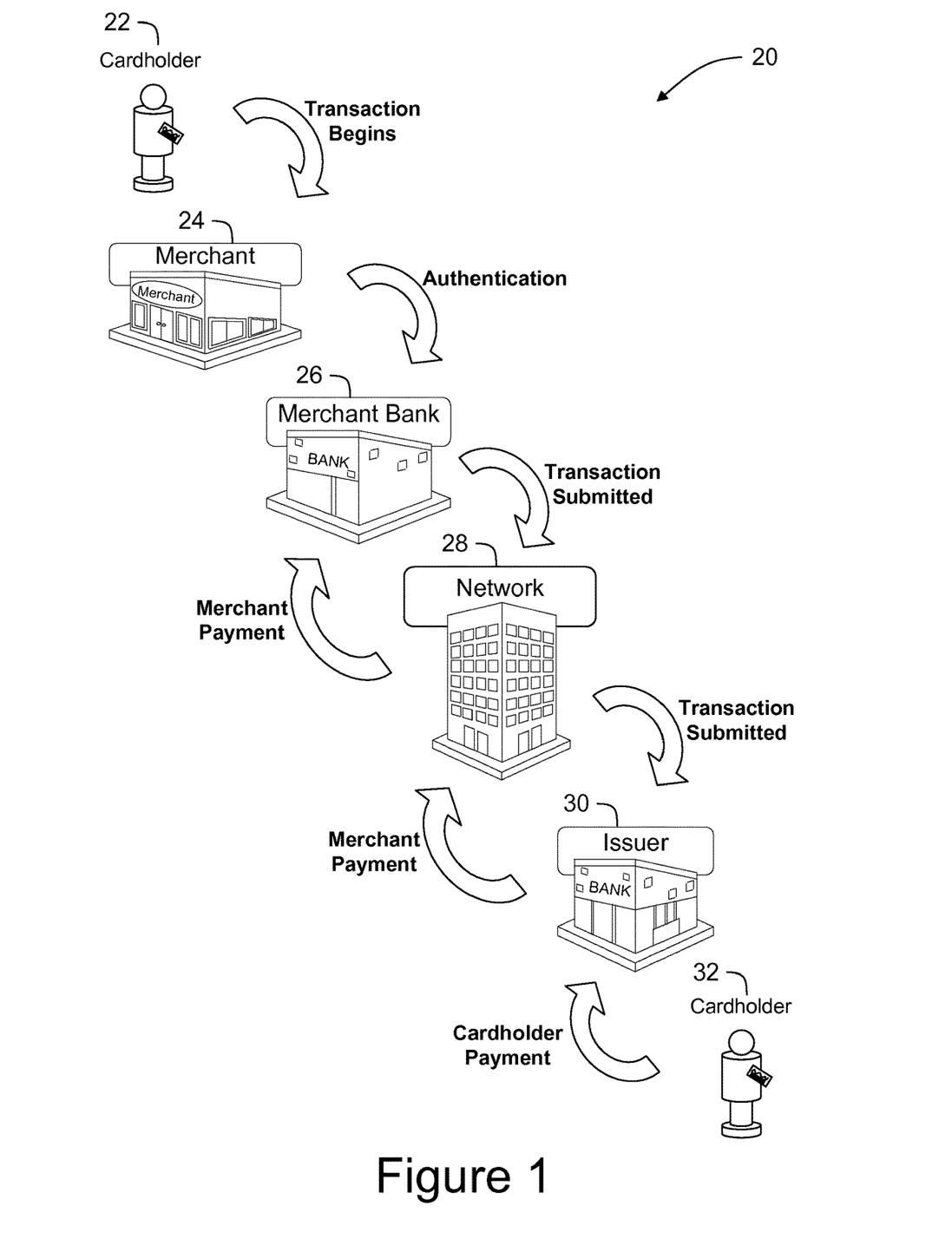
FIG. 1 is a schematic diagram illustrating a known multi-party payment card industry system for enabling ordinary payment-by-card transactions in which the merchants and issuer do not need to have a one-to-one special relationship.

FIG. 1 illustrates a known multi-party payment card industry system 20 for enabling ordinary payment-by-card transactions in which a merchant 24 and an issuer 30 do not need to have a one-to-one special relationship. A financial institution 30 called the "issuer" provides a card, such as a credit card, to a cardholder 22, who uses the card to tender payment for a purchase from a merchant 24. To accept payment with the card, merchant 24 must normally establish an account with a financial institution 26 called the "merchant bank," "acquiring bank," or "acquirer bank." When cardholder 22 tenders payment for a purchase with a card, merchant 24 requests authorization from merchant bank 26 for the amount of the purchase. The request may be performed over the telephone, but is usually performed through the use of a point-of-sale terminal, which reads the cardholder's account information from the magnetic stripe or chip on the card and communicates electronically with the transaction processing computers of merchant bank 26. Alternatively, merchant bank 26 may authorize a third party called a "merchant processor," an "acquiring processor," or a "third party processor" to perform transaction processing on its behalf. In this case, the point-of-sale terminal will be configured to communicate with the third party.

Using an interchange computer system that is associated with a network interchange 28, the computers of merchant bank 26 communicate with the computers of issuer bank 30 to determine whether a cardholder's account 32 is in good standing and whether the purchase is covered by the consumer's available credit line. Based on these determinations, the request for authorization will be declined or accepted. If the request is accepted, an authorization code is issued to merchant 24 and an available credit line of cardholder's account 32 is decreased.

Normally, a charge for a credit transaction is not posted immediately to cardholder's account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated.

After a transaction is captured, the transaction is settled between merchant 24, merchant bank 26, network interchange 28, and issuer 30. Settlement refers to the transfer of financial data or funds between merchant 24, merchant bank 26, network interchange 28, and issuer 30 related to the transaction. Usually, transactions are captured and accumulated into a "batch," which are settled as a group. More specifically, a transaction is typically settled between issuer 30 and network interchange 28, and then between network interchange 28 and merchant bank 26, and then between merchant bank 26 and merchant 24.

Figure 2:
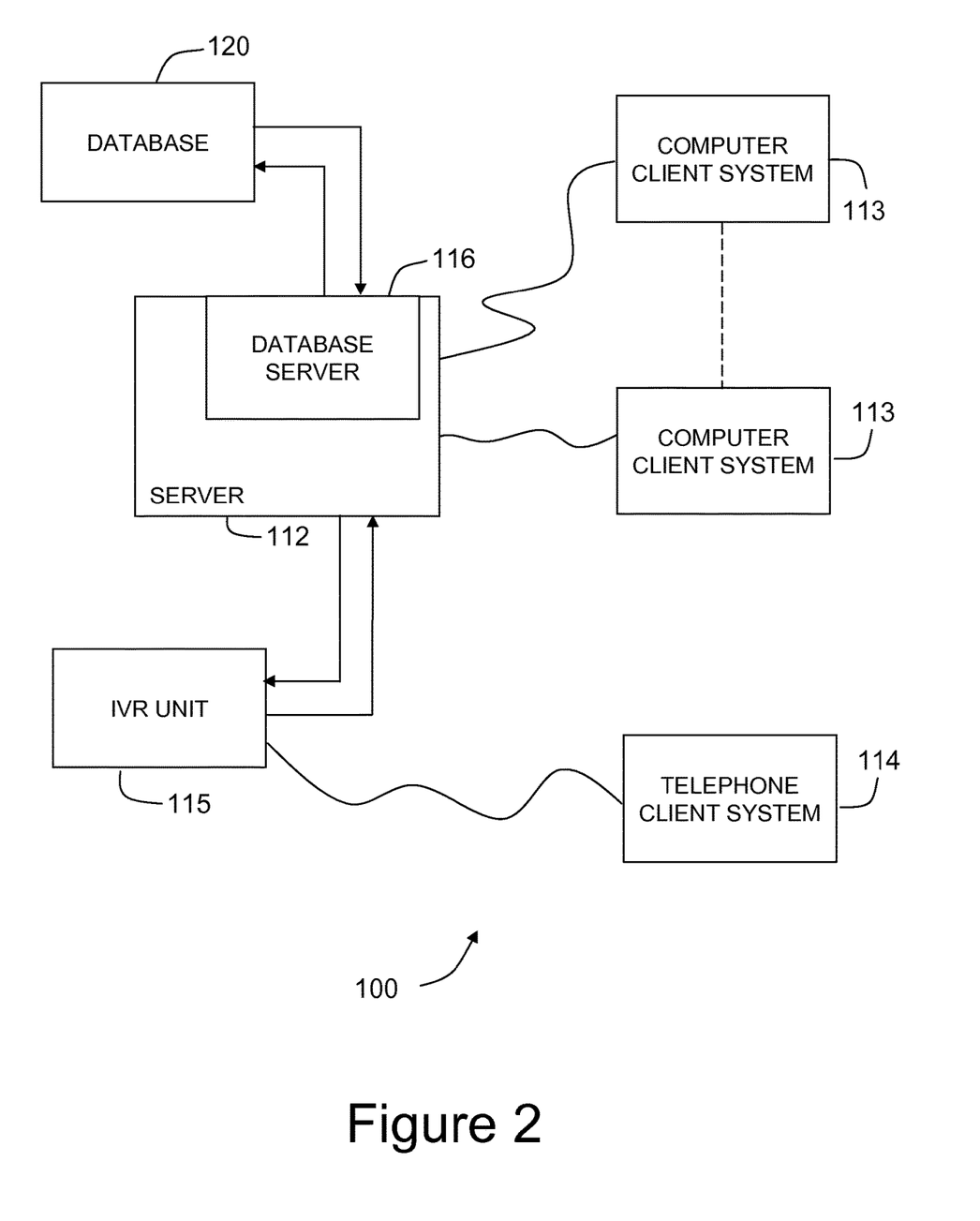
FIG. 2 is a simplified block diagram of a typical server architecture of a system that facilitates authenticating an identity of a customer in accordance with the present invention.

FIG. 2 is a simplified block diagram of an exemplary system 100 in accordance with one embodiment of the present invention. In the exemplary embodiment, system 100 facilitates ensuring that a person attempting to use a card or its corresponding account numbers is the legitimate cardholder. More specifically, in the exemplary embodiment, system 100 includes a server system 112 communicatively coupled to a plurality of client systems 113 and 114, also known as input devices.

In the exemplary embodiment, client systems 113 are computers that include a web browser, which enable client systems 113 to access server system 112 using the Internet. More specifically, client systems 113 are communicatively coupled to the Internet through many interfaces including, but not limited to, at least one of a network, such as a local area network (LAN), a wide area network (WAN), or an integrated services digital network (ISDN), a dial-up-connection, a digital subscriber line (DSL), and a cable modem. Client systems 113 can be any device capable of accessing the Internet including, but not limited to, a desktop computer, a laptop computer, a personal digital assistant (PDA), or other web-based connectable equipment.

Moreover, in the exemplary embodiment, client system 114 is a telephone that is capable of accessing server system 112 over a telephone or a cellular telephone network. In the exemplary embodiment, client system 114 is communicatively coupled to server system 112 via interactive voice recognition (IVR) system 115. In an alternate embodiment, client system 114 is communicatively coupled to server system 112 via an operator. In another alternate embodiment, client system 114 is communicatively coupled directly to server system 112. Client system 114 can be any device capable of communicating with server system 112 including, but not limited to, an analog, a digital, a single-line, a multiple-line, a Voice-over-Internet Protocol (VOIP), and a T1 telephone.

A database server 116 is communicatively coupled to a database 120 that contains a variety of information including, but not limited to, a name of a cardholder, an account number, a transaction history, and other cardholder-related information. In the exemplary embodiment, database 120 is stored remotely from server system 112. In an alternate embodiment, database 120 is decentralized. In the exemplary embodiment, a person can access database 120 via client systems 113 and 114 by logging onto server system 112.

In the example embodiment, server system 112 may be associated with a network interchange, and may be referred to as an interchange computer system. Server system 112 may be used for processing transaction data and for registering cardholders into a plurality of programs offered by the network interchange. In addition, at least one of client systems 113, 114 may include a computer system associated with an issuer of a transaction card. Accordingly, server system 112 and client systems 113, 114 may be utilized to process transaction data relating to purchases made by a cardholder utilizing a transaction card that is processed by the network interchange and issued by the associated issuer. Another client system 113, 114 may be associated with a user or a cardholder seeking to register, access information or process a transaction with at least one of the network interchange or the issuer.

The embodiments illustrated and described herein as well as embodiments not specifically described herein but within the scope of aspects of the invention constitute exemplary means for authenticating an identity of a user of a financial transaction card, and more particularly, constitute exemplary means for authenticating an identity of a user of a financial transaction card when the user is attempting to register with a program offered by a network interchange by generating an authentication message that is accessed by the user from an issuer of the financial transaction card. For example, the server system 112 or the client system 113, 114, or any other similar computer device, programmed with computer-executable instructions to execute processes and techniques with a processor as described herein, constitutes exemplary means for authenticating an identity of a user of a financial transaction card.

Figure 3:
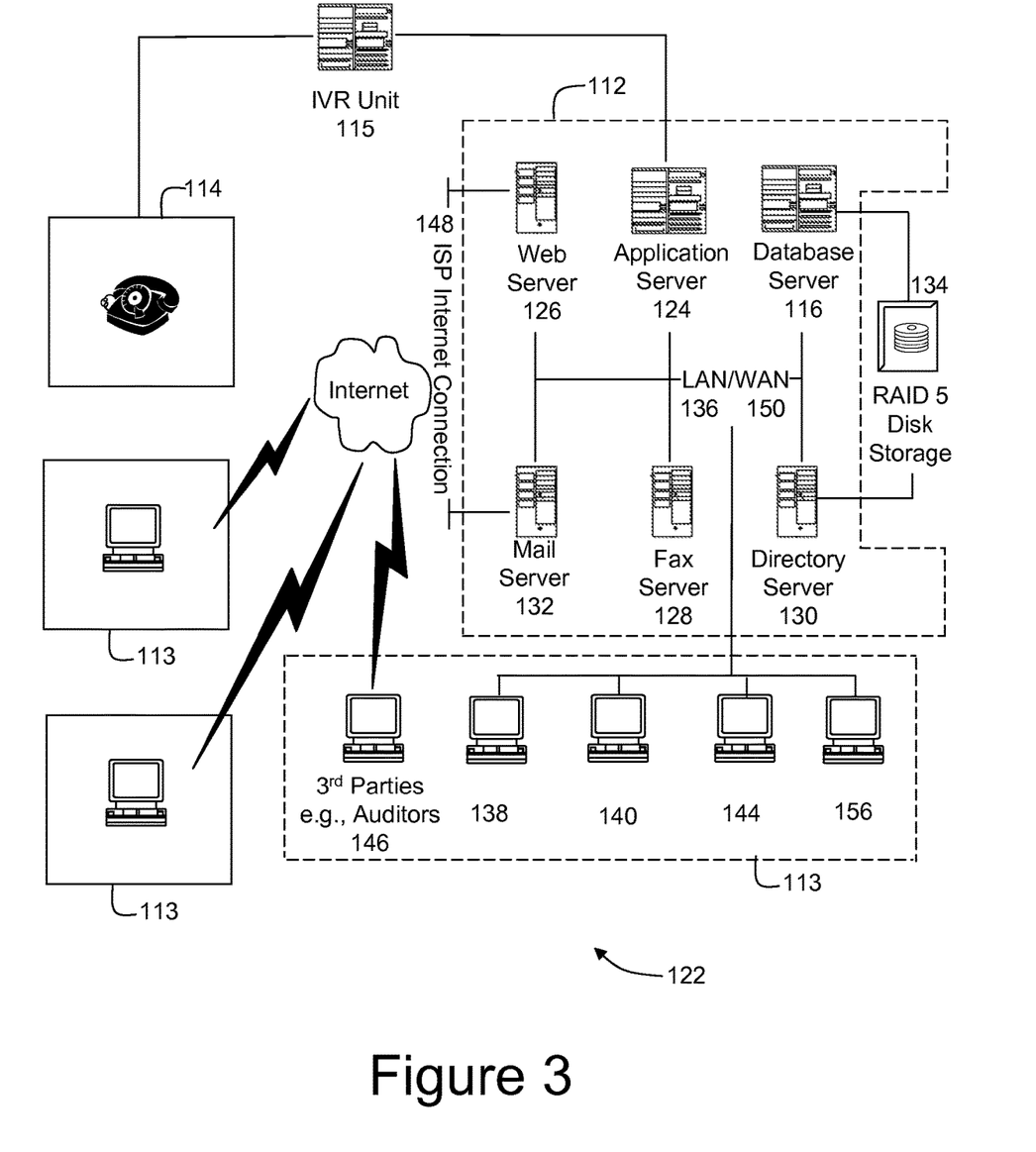
FIG. 3 is an expanded block diagram of the typical system shown in FIG. 2 in accordance with the present invention.

FIG. 3 is an expanded block diagram of an exemplary system 122 in accordance with one embodiment of the present invention. The components of system 122, which are identical to components of system 100 (shown in FIG. 2), are identified in FIG. 3 using the same reference numerals as used in FIG. 2.

In the exemplary embodiment, system 122 includes server system 112 and client systems 113 and 114. Server system 112 includes database server 116 and further includes an application server 124, a web server 126, a fax server 128, a directory server 130, and a mail server 132. A disk storage unit 134 is communicatively coupled to database server 116 and directory server 130. In the exemplary embodiment, servers 116, 124, 126, 128, 130, and 132 are communicatively coupled to a LAN 136 and/or a WAN 150. Server system 112 is also communicatively coupled to IVR unit 115.

In the exemplary embodiment, a system administrator workstation 138, a user workstation 140, an employee workstation 144, and a manager workstation 156 are communicatively coupled to LAN 136 and/or WAN 150. In an alternate embodiment, workstations 138, 140, 144, and 156 are communicatively coupled to LAN 136 and/or WAN 150 through the Internet or an intranet. Although the functions performed at workstations 138, 140, 144, and 146 are illustrated as being associated with separate functions, such functions can be performed at any computer or workstation communicatively coupled to LAN 136 and/or WAN 150. Workstations 138, 140, 144, and 146 are illustrated as being associated with separate functions only to facilitate an understanding of the different types of functions that can be performed by persons having access to LAN 136 and/or WAN 150. In an alternate embodiment, workstations 138, 140, 144, and 156 can be telephone client system 114 communicatively coupled to server system 112.

In the exemplary embodiment, server system 112 is communicatively coupled to third parties 146, e.g., auditors, using an ISP Internet connection 148. In an alternate embodiment, any network communication, such as LAN 136 and/or WAN 150, can communicatively couple third parties 146 to server system 112. In the exemplary embodiment, any authorized individual having third party workstation 146 can access server system 112, including employees and managers.

Figure 4:
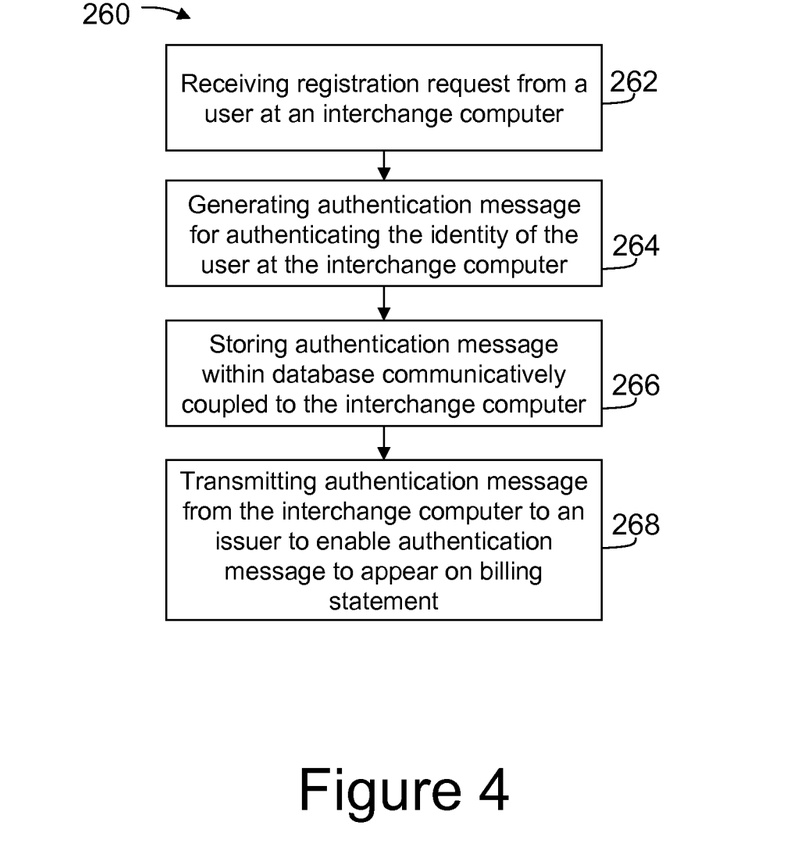
FIG. 4 is a flowchart illustrating a first portion of an exemplary process for authenticating an identity of a user of a transaction card that can be utilized by the system shown in FIG. 2 in accordance with the present invention.

FIG. 4 is a flowchart 260 illustrating a first portion of an exemplary process for authenticating an identity of a user of a transaction card. In the exemplary embodiment, flowchart 260 illustrates a first portion of one exemplary process that can be implemented by system 100 (shown in FIG. 2). The first portion of the process described in flowchart 260 relates to the generation of an authentication message by server system 112, wherein the authentication message is generated on behalf of the network interchange.

The process begins when the user attempts to register a card for a program, and computer system 112 receives 262 a registration request from the user. In the exemplary embodiment, the user uses a remote input device, such as client system 113 or 114, to provide cardholder data, such as an account number, cardholder name, etc., to the network interchange including computer system 112. Exemplary programs may include at least one of an express checkout program, an electronic wallet program, a rewards program, or a merchant sales program. For example, a user may wish to enroll in a promotional program that provides a discount to a cardholder shopping at a particular vendor with a particular card. In the exemplary embodiment, the user is an existing cardholder with an active account with a card company.

In the exemplary embodiment, upon receiving the registration request, server system 112 generates 264 an authentication message for the account associated with the account number provided by the user. In one embodiment, the authentication message is generated by the network interchange, and is generated in a manner that is similar to a typical transaction that is charged to the account associated with the account number provided by the user. This transaction charged to the account could include at least one of a nominal amount (a few cents) debited or credited to the account, and a no charge amount issued to the account. The authentication message generated 264 by server system 112 is communicated, either in a transaction format or in some other format, to the issuer such that the authentication message can be utilized to authenticate the identity of the user.

Server system 112 stores 266 the transaction data within database 120 (shown in FIG. 2). The transaction data includes the authentication message along with various transaction-related information including, but not limited to, a merchant name and a transaction amount. The authentication message can be stored in any field as long as the legitimate cardholder would have reasonable access to it. For example, a legitimate cardholder would have reasonable access to any information that is published in a billing statement, such as a merchant name and a transaction amount. In one embodiment, an authentication message "123456" is stored in a merchant name field that recites "Express Checkout—123456". In such an embodiment, "Express Checkout" refers to the program in which the user wishes to enroll and "123456" refers to the authentication message. A numeric authentication message facilitates entering the authentication message into a telephone, such as client system 114. However, any alphanumeric, visual, or audial authentication message that may reasonably be entered into client system 113 or 114 may be used to facilitate authenticating an identity of a user.

In the exemplary embodiment, server system 112 transmits 268 the transaction data including the authentication message to an issuer computer system 114 to enable the authentication message to be provided to the legitimate cardholders. In the exemplary embodiment, the authentication message is provided to the issuer so that it can be included within a billing statement associated with the account number provided by the user. The billing statement can be either a paper document that may be sent via mail to the legitimate cardholder or an electronic document that may be available online or sent via email.

Figure 5:
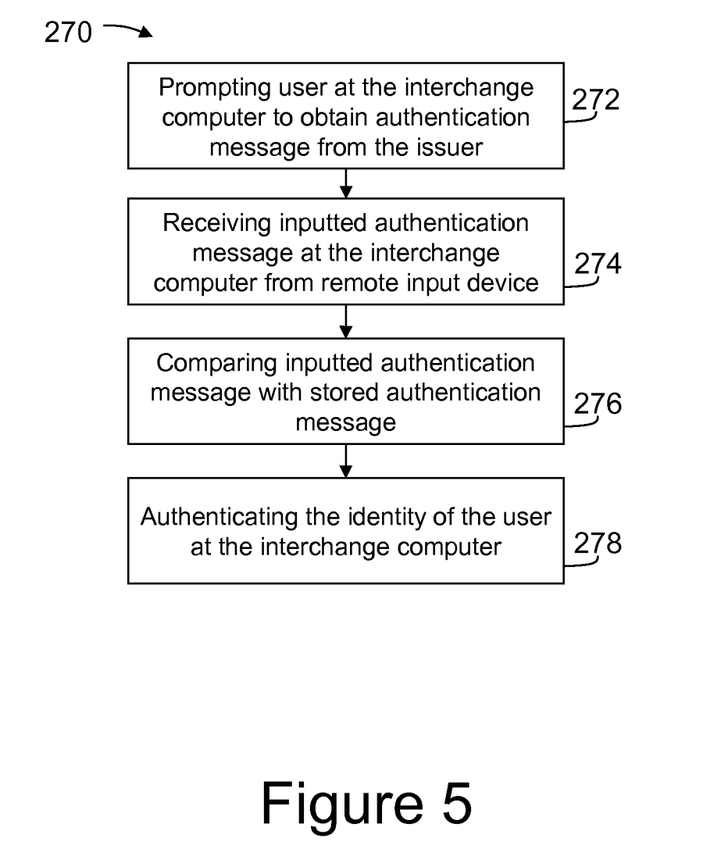
FIG. 5 is a flowchart illustrating a second portion of the exemplary process shown in FIG. 4.

FIG. 5 is a flowchart 270 illustrating a second portion of the exemplary process shown in FIG. 4. Flowchart 270 is the second portion of the process shown in FIG. 4 for authenticating an identity of a user of a transaction card. The process shown in flowchart 270 is implemented by system 100 (shown in FIG. 2).

In the exemplary embodiment, flowchart 270 continues the process shown in flowchart 260 (shown in FIG. 4), and the user uses client system 113 or 114 to finalize registration by providing the authentication message to server system 112. Specifically, server system 112, which is associated with the network interchange, prompts 272 the user to obtain the authentication message from the issuer's billing statement and input the authentication message into client system 113 or 114 to authenticate the identity of the user.

In one embodiment, client system 113 is a computer system associated with the issuer of the transaction card. Client system 113 includes additional security measures that the user must satisfy in order to gain access to the electronic billing statement. Such additional security measures may include, but are not limited to a password, a PIN or an authentication image or sound. In other words, for a user to access an electronic copy of a billing statement associated with the transaction card, the user can use a remote computer system to access the billing statement through the issuer's computer system. In order to gain access, the user would have to overcome or satisfy any security measures the issuer already has in place such that the user can view the billing statement. These additional security measures facilitate ensuring that the user is the legitimate cardholder of the transaction card associated with the billing statement.

After the user accesses the billing statement provided by the issuer, the user is then able to see the authentication message generated by the interchange computer system. The user is then prompted to provide the obtained authentication message to the interchange computer system Once server system 112 receives 274 an inputted authentication message from client system 113 or 114, system 112 compares 276 the inputted authentication message with the stored authentication message associated with the account. In the exemplary embodiment, if the inputted authentication message matches the stored authentication message, system 112 authenticates 278 the identity of the user as the legitimate cardholder. The user can then continue to register the account for the program through the interchange computer. In one embodiment, the card company stores, for program registration purposes, customer information within a database including a customer name, an account number, and other identifying information. If, however, the inputted message does not match the stored authentication message, system 112 does not register the account with the program.

Flowcharts 260 and 270 may also be used for risk-based authentication or reauthentication purposes. For example, there are many instances where the card company may want to ensure that a transaction is performed by a legitimate cardholder, such as a transaction from a remote input device with a new Internet Protocol (IP) address, a transaction from a foreign country, a transaction that is relatively large, or an increase in the frequency of transactions. In these cases, the systems and methods described herein may be employed to authenticate or reauthenticate a user of a transaction card, particularly in the case of a card not present transaction, so that at least one of the network interchange and the issuer can be confident that the user is the legitimate cardholder.

While the invention has been described in terms of various specific embodiments, those skilled in the art recognizes that the invention can be practiced with modification within the spirit and scope of the claims.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal languages of the claims.

What is claimed is:

1. A method implemented by a payment card network server computer for authenticating an identity of a user of a transaction card as being a legitimate cardholder, the user initiating a registration process to register the transaction card with a program offered by the payment card network, the payment card network server computer communicatively coupled to a memory, said method comprising:

receiving, at the payment card network server computer, a registration request message from a user computing device, the registration request message including a program identifier identifying the program, wherein the program identifier indicates the program is one of an express checkout program, an electronic wallet program, and a rewards program;

generating, at the payment card network server computer, in response to the registration request message, an authentication message including one or more characters authenticating the user as the legitimate cardholder;

generating, at the payment card network server computer, a transaction data message that includes the authentication message and the program identifier, the transaction data message formatted for transmission over the payment card network;

storing the authentication message within the memory;

transmitting, by the payment card network server computer, the transaction data message to an issuing bank computing device associated with an issuing bank via the payment card network, the issuing bank having issued the transaction card to the legitimate cardholder, the issuing bank computing device being separate from the payment card network server computer, wherein the issuing bank electronically inserts the program identifier and the authentication message received from the payment card network server computer in the transaction data message into a billing record of the transaction card to cause the billing record to list, in a merchant name field the authentication message generated by the payment card network server computer in association with the program identifier that indicates the program is one of an express checkout program, an electronic wallet program, and a rewards program;

displaying, by the payment card network server computer, a prompt on the user computing device to provide the authentication message to the payment card network server computer for completing the registration request, wherein the prompt instructs the user to complete the previously initiated registration process by i) gaining electronic access to the billing record that includes the authentication message by satisfying at least one digital security measure of the issuing bank computing device for gaining access and ii) inputting the authentication message listed in the electronically accessed billing record into the user comquting device;

receiving an inputted authentication message from the user computing device;

confirming whether the user was able to access the billing record by comparing the inputted authentication message with the stored authentication message that corresponds to the authentication message listed in the merchant name field of the billing record in association with the program identifier; and authenticating the user and completing the previously initiated registration process of the user for the express checkout program, the electronic wallet program, or the rewards program when the inputted authentication message matches the authentication message listed in the merchant name field of the billing record in association with the program identifier identifying the express checkout program, the electronic wallet program, or the rewards program.

2. A method in accordance with claim 1, wherein the user computing device communicates with the payment card network server computer and the issuing bank computing device via one or more of a computer network connection and a telephonic connection.

3. A method in accordance with claim 1, wherein the payment card network server computer is associated with the payment card network, wherein the generating of the authentication message further comprises initiating a transaction by the payment card network having a zero transaction amount associated therewith, and wherein the program identifier and the authentication message are at least one of an alpha code and an alpha-numeric code.

4. A method in accordance with claim 1, wherein the at least one digital security measure includes using one or more of a password, a personal identification number (PIN), an authentication image, and an authentication sound to gain electronic access to the billing record.

5. A method in accordance with claim 3, wherein the transaction is for at least one of a nominal amount credited to an account associated with the transaction card, a nominal amount debited to the account associated with the transaction card, and a no charge amount issued to the account associated with the transaction card.

6. A payment card network server computer for authenticating an identity of a user of a transaction card as a legitimate cardholder, the user seeking to register the transaction card with a program offered by the payment card network via a registration process, the payment card network server computer associated with the payment card network and communicatively coupled to a memory, said server computer configured to:

receive a registration request message from the user using a user computing device, the registration request message including a program identifier identifying the program, wherein the program identifier indicates the program is one of an express checkout program, an electronic wallet program, and a rewards program;

generate, in response to the registration request message, an authentication message including one or more characters authenticating the user as the legitimate cardholder;

generate a transaction data message that includes the authentication message and the program identifier, the transaction data message formatted for transmission over the payment card network;

store the authentication message within the memory;

transmit the transaction data message to an issuing bank computing device associated with an issuing bank via the payment card network, the issuing bank having issued the transaction card to the legitimate cardholder, the issuing bank computing device being separate from the payment card network server computer, wherein the issuing bank electronically inserts the program identifier and the authentication message received from the payment card network server computer in the transaction data message into a billing record of the transaction card to cause the billing record to list, in a merchant name field, the authentication message generated by the payment card network server computer in association with the program identifier that indicates the program is one of an express checkout program, an electronic wallet program, and a rewards program;

display a prompt on the user computing device to provide the authentication message to the payment card network server computer for completing the registration request, wherein the prompt instructs the user to complete the previously initiated registration process by i) gaining electronic access to the billing record that includes the authentication message by satisfying at least one digital security measure of the issuing bank computing device for gaining access and ii) inputting the authentication message listed in the electronically accessed billing record into the user computing device;

receive a inputted authentication message from the user computing device;

confirm whether the user was able to access the billing record by comparing the inputted authentication message with the stored authentication message that corresponds to the authentication message listed in the merchant name field of the billing record in association with the program identifier; and authenticate the user and complete the previously initiated registration process for the user for the express checkout program, the electronic wallet program, or the rewards program when the inputted authentication message matches the authentication message listed in the merchant name field of the billing record in association with the program identifier identifying the express checkout program, the electronic wallet program, or the rewards program.

7. A server computer for authenticating an identity of a user in accordance with claim 6, wherein said payment card network server computer is associated with the payment card network and is further configured to initiate a transaction having a zero transaction amount associated therewith, and wherein the program identifier and the authentication message are at least one of an alpha code and an alpha-numeric code.

8. A server computer for authenticating an identity of a user in accordance with claim 6, wherein said at least one digital security measure includes using one or more of a password, a personal identification number (PIN), an authentication image, and an authentication sound to gain electronic access to the billing record.

9. A server computer for authenticating an identity of a user in accordance with claim 6, wherein the transaction is for at least one of a nominal amount credited to an account associated with the transaction card, a nominal amount debited to the account associated with the transaction card, and a no charge amount issued to the account associated with the transaction card.

10. A system for authenticating an identity of a user of a transaction card as a legitimate cardholder, the user seeking to register the transaction card with a program offered by a payment card network via a registration process, said system comprising:
a user computing device;
an issuing bank computer system associated with an issuing bank of the transaction card; and
an interchange computer system associated with the payment card network, said interchange computer system communicatively coupled to a memory, the input device, and the issuing bank computer system, said interchange computer system being configured to:
receive a registration request message from the user using a user computing device, the registration request message including a program identifier identifying the program, wherein the program identifier indicates the program is one of an express checkout program, an electronic wallet program, and a rewards program;
generate, in response to the registration request message, an authentication message including one or more characters authenticating the user as the legitimate cardholder;
generate a transaction data message that includes the authentication message and the program identifier, the transaction data message formatted for transmission over the payment card network;
store the authentication message within the memory;
transmit the transaction data message to an issuing bank computing device associated with an issuing bank via the payment card network, the issuing bank having issued the transaction card to the legitimate cardholder, the issuing bank computing device being separate from the payment card network server computer, wherein the issuing bank electronically inserts the program identifier and the authentication message received from said interchange computer system in the transaction data message into a billing record of the transaction card to cause the billing record to list, in a merchant name field, the authentication message generated by said interchange computer system in association with the program identifier that indicates the program is one of an express checkout program, an electronic wallet program, and a rewards program;
display a prompt on the user computing device to provide the authentication message to the payment card network server computer for completing the registration request, wherein the prompt instructs the user to complete the previously initiated registration process by i) gaining electronic access to the billing record that includes the authentication message by satisfying at least one digital security measure of the issuing bank computing device for gaining access and ii) inputting the authentication message listed in the electronically accessed billing record into the user computing device;
receive a inputted authentication message from the user computing device;
confirm whether the user was able to access the billing record by comparing the inputted authentication message with the stored authentication message that corresponds to the authentication message listed in the merchant name field of the billing record in association with the program identifier; and
authenticate the user and complete the previously initiated registration process for the user for the express checkout program, the electronic wallet program, or the rewards program when the inputted authentication message matches the authentication message listed in the merchant name field of the billing record in association with the program identifier identifying the express checkout program, the electronic wallet program, or the rewards program.

11. A system for authenticating an identity of a user in accordance with claim 10, wherein said user computing device communicates with the payment card network server computer and the issuing bank computing device via one or more of a computer network connection and a telephonic connection.

12. A system for authenticating an identity of a user in accordance with claim 10, wherein said interchange computer system is further configured to generate the transaction data message having a zero transaction amount, and wherein the program identifier and the authentication message are at least one of an alpha code and an alpha-numeric code.

13. A system for authenticating an identity of a user in accordance with claim 10, wherein the at least one digital security measure includes using one or more of a password, a personal identification number (PIN), an authentication image, and an authentication sound to gain electronic access to the billing record.

14. A system for authenticating an identity of a user in accordance with claim 10, wherein the transaction is for at least one of a nominal amount credited to an account associated with the transaction card, a nominal amount debited to the account associated with the transaction card, and a no charge amount issued to the issuing bank associated with the transaction card.

15. A computer program embodied on a computer-readable medium for authenticating an identity of a user of a transaction card as a legitimate holder, the user seeking to register the transaction card with a program offered by a payment card network via a registration process, a payment card network server computer configured to store and process the computer program, the computer program comprising at least one code segment that, when executed by the payment card network server computer, causes the payment card network server computer to:
receive a registration request message from the user using the input device, the registration request message including a program identifier identifying said program, wherein the program identifier indicates the program is one of an express checkout program, an electronic wallet program, and a rewards program;

generate, in response to the registration request message, an authentication message including one or more characters authenticating the user as the legitimate cardholder;

generate a transaction data message that includes the authentication message and the program identifier, the transaction data message formatted for transmission over the payment card network;

store the authentication message;

transmit the transaction data message to an issuing bank computing device associated with an issuing bank via the payment card network, the issuing bank having issued the transaction card to the legitimate cardholder, the issuing bank computing device being separate from the payment card network server computer, wherein the issuing bank electronically inserts the program identifier and the authentication message received from the payment card network server computer in the transaction data message into a billing record of the transaction card to cause the billing record to list, in a merchant name field, the authentication message generated by the payment card network server computer in association with the program identifier that indicates the program is one of an express checkout program, an electronic wallet program, and a rewards program;

display a prompt on the user computing device to provide the authentication message to the payment card network server computer for completing the registration request, wherein the prompt instructs the user to complete the previously initiated registration process by i) gaining electronic access to the billing record that includes the authentication message by satisfying at least one digital security measure of the issuing bank computing device for gaining access and ii) inputting the authentication message listed in the electronically accessed billing record into the user computing device;

receive a inputted authentication message from the user computing device;

confirm whether the user was able to access the billing record by comparing the inputted authentication message with the stored authentication message that corresponds to the authentication message listed in the merchant name field of the billing record in association with the program identifier;

authenticate the user and complete the previously initiated registration process for the user for the express checkout program, the electronic wallet program, or the rewards program when the inputted authentication message matches the authentication message listed in the merchant name field of the billing record in association with the program identifier identifying the express checkout program, the electronic wallet program, or the rewards program.

* * * * *